United States Patent
Barrilado Gonzalez et al.

(10) Patent No.: US 11,018,844 B2
(45) Date of Patent: May 25, 2021

(54) TIME-ENCODED MESSAGING FOR RADAR CASCADED SYNCHRONIZATION SYSTEM

(71) Applicant: NXP USA, INC., Austin, TX (US)

(72) Inventors: Andres Barrilado Gonzalez, Toulouse (FR); Olivier Vincent Doaré, La Salvetat St Gilles (FR); Didier Salle, Toulouse (FR)

(73) Assignee: NXP USA, INC., Austin, TX (US)

(*) Notice: Subject to any disclaimer, the term of this patent is extended or adjusted under 35 U.S.C. 154(b) by 75 days.

(21) Appl. No.: 16/433,520

(22) Filed: Jun. 6, 2019

(65) Prior Publication Data
US 2019/0386810 A1  Dec. 19, 2019

(30) Foreign Application Priority Data
Jun. 18, 2018  (EP) ..................... 18305748

(51) Int. Cl.
*H04L 7/00* (2006.01)
*G01S 13/931* (2020.01)
*G06F 9/30* (2018.01)

(52) U.S. Cl.
CPC .......... *H04L 7/0087* (2013.01); *G01S 13/931* (2013.01); *G06F 9/30087* (2013.01)

(58) Field of Classification Search
CPC ......... H04L 7/0087; H04B 14/00; H04B 7/17; H04B 10/524; H04B 14/023; H04B 14/026; G01S 13/931; G06F 9/30087
USPC ................................. 375/353, 354
See application file for complete search history.

(56) References Cited

U.S. PATENT DOCUMENTS

| | | |
|---|---|---|
| 9,208,008 B2 | 12/2015 | Shirlen et al. |
| 2004/0190666 A1* | 9/2004 | Aiello ............ H04L 27/2003 375/354 |
| 2013/0322461 A1 | 12/2013 | Poulsen |
| 2017/0206182 A1 | 7/2017 | Bas et al. |
| 2017/0277651 A1 | 9/2017 | Ngo et al. |

(Continued)

FOREIGN PATENT DOCUMENTS

| | | |
|---|---|---|
| WO | 2016095435 A1 | 6/2016 |
| WO | 2018026871 A1 | 2/2018 |

OTHER PUBLICATIONS

EP Application No. 18305858.5 filed on Jul. 2, 2018, entitled "Communication Unit and Method for Clock Distribution and Synchronization".

(Continued)

*Primary Examiner* — Kevin M Burd

(57) ABSTRACT

A method for synchronizing a cascaded RADAR system (80) includes modulating (320) with a master RADAR system (12), an amplitude of a sequence of clock cycles of a clock (70) in response to a Ramp Frame Start (RFS) signal (92). The master RADAR system determines (322) a duration (310, 312, 314) of the sequence of clock cycles based on a code. A slave RADAR system (14) demodulates (324) the sequence of clock cycles to recover the clock and the RFS signal, wherein a clock leading edge of the clock is phase aligned to an RFS leading edge of the RFS signal. The slave RADAR system decodes (326) the code from the duration of the sequence of clock cycles, wherein the code determines an action performed by the slave RADAR system in response to receiving a data signal from the master RADAR system.

20 Claims, 8 Drawing Sheets

(56) References Cited

U.S. PATENT DOCUMENTS

2018/0115409 A1    4/2018  Nayyar et al.

OTHER PUBLICATIONS

EP Application No. 18305856.9 filed on Jul. 2, 2018, entitled "Communication Unit, Integrated Circuits and Method for Clock and Data Synchronization".

* cited by examiner

TIME-ENCODED MESSAGING FOR RADAR CASCADED SYNCHRONIZATION SYSTEM

CROSS-REFERENCE TO RELATED APPLICATIONS

This application claims the priority under 35 U.S.C. § 119 of European Patent application no. 18305748.8, filed on 18 Jun. 2018, the contents of which are incorporated by reference herein.

FIELD

This disclosure relates generally to advanced RADAR systems, and more specifically to synchronous state machine execution of cascaded RADAR systems.

BACKGROUND

Automobiles are increasingly adopting RADAR technology for a variety of uses, including improved automated functions such as cruise control, as well as fully autonomous vehicle operation. Highly automated applications require stringent angular and range resolution. Angular resolution is directly related to the number of receiver antennae of the RADAR system and the positioning of the antennae with respect to each other. Range resolution is related to the RADAR system's analog to digital converter's (ADC) bandwidth.

Increasing the number of RADAR antennae requires a reference clock to be synchronized across all of the RADAR units and for a ramp frame start (RFS) signal to be aligned to this clock. The RFS signal determines the start of a RADAR chirp transmission, wherein a transmit frequency is varied over a ramp interval. Different transmission modes, (including self-test for example), further require the synchronization of state machine information between the RADAR units. Synchronizing the reference clock, RFS signal and state machine information should be accomplished in a reliable and space efficient manner.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for a RADAR cascaded synchronization system with phase alignment between a common reference clock, used by a plurality of cascaded RADAR units, and the RFS signal. The cascaded RADAR units form a system that further includes temporally-encoded messaging to synchronize machine state information between each RADAR unit. Messaging. (also referred to as a trigger or a code), enables unidirectional communication between a master RADAR unit and one or more cascaded slave units, while retaining synchronization with the reference clock.

To enable different angular resolution levels for different markets, a RADAR system includes a plurality of cascaded RADAR units, with one chosen as the master, thereby multiplying the number of transmit and receive channels with minimal added complexity and area. In various embodiments, the number of cascaded RADAR units is between two and four. In another embodiment, more than four RADAR units are cascaded. The master provides a clock and an LO signal to the remaining RADAR units, configured as slaves. In various embodiments, depending upon the code, the LO signal has specific characteristics (e.g., phase, frequency, chirp ramp rate and chirp ramp duration). For certain states, the master RADAR unit and the slave RADAR units must execute synchronously, however the master unit and the slave unit may not have the same execution duration. In other embodiments, the LO signal is replaced with a different signal.

Figure 1:
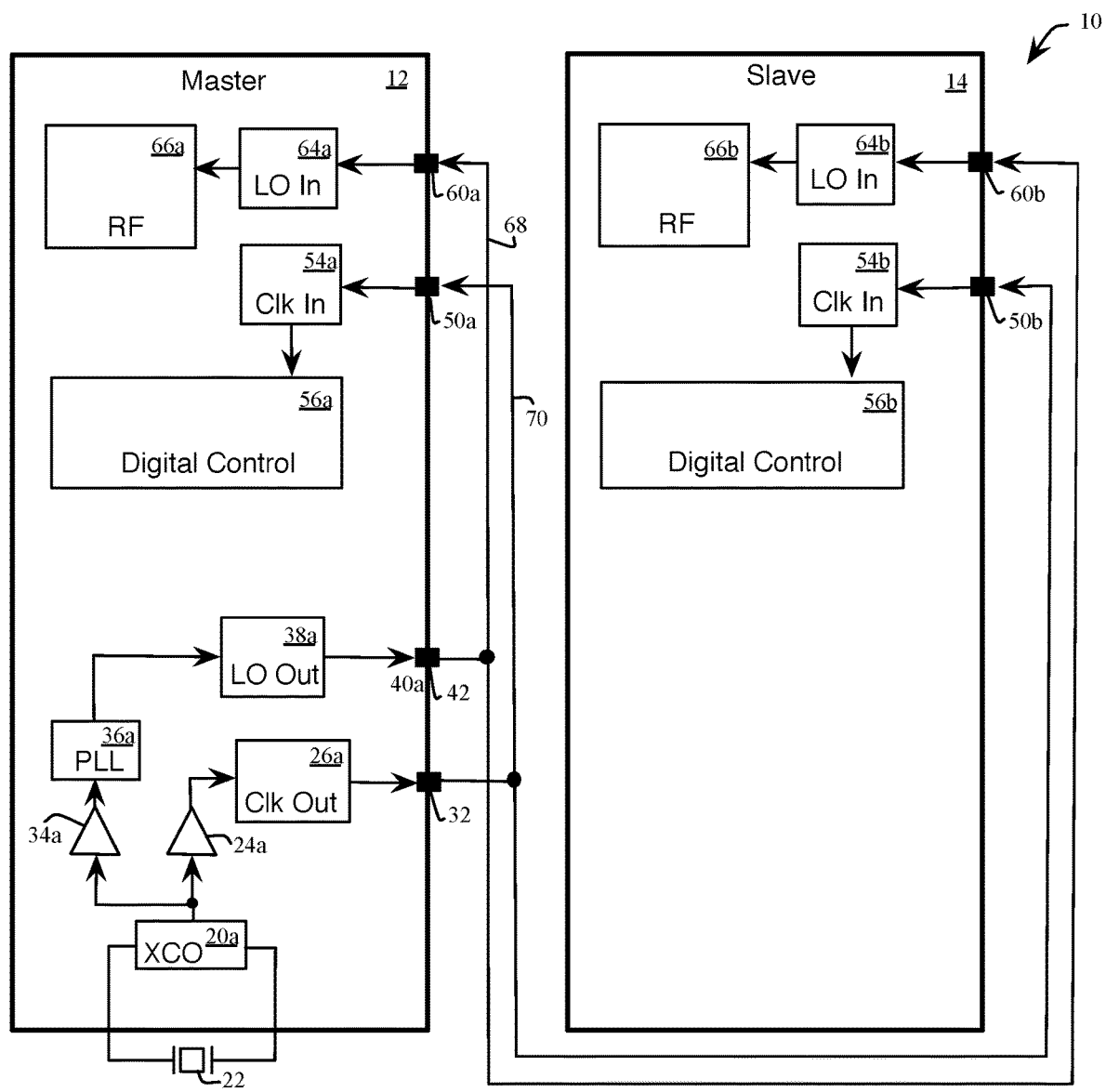
FIG. 1 is a schematic view of an embodiment of a cascaded synchronization system including a distribution of a clock and a Local Oscillator (LO).

FIG. 1 shows an embodiment 10 of a cascaded RADAR system, including a master RADAR unit 12. ("Master") and a slave RADAR unit 14. ("Slave"). The Master 12 includes a crystal oscillator 20a (XCO) configured to generate a frequency based on a resonant frequency formed by a crystal 22. The output of the XCO 20a is buffered with a buffer 24a to drive a master clock output circuit 26a, which drives a master clock at port 32. In one embodiment, the master clock is nominally 120 MHZ. In another embodiment, the master clock is another sub-Gigahertz frequency.

The Master 12 includes a buffer 34a configured to buffer the output of the XCO 20a to drive a Phase Locked Loop (PLL) 36a. The PLL 36a drives an LO Out circuit 38a, which drives an LO at port 42. In one embodiment, the LO is nominally 40 GHZ. In another embodiments, the LO is another microwave frequency. In various embodiments, the same circuits XCO 20a, buffers 24a and 34a, master clock output circuit 26a, PLL 36a and LO Out 38a exist in the Slave 14, (not shown for brevity), but are disabled. The Master 12 further includes a port 50a connected to an input clock circuit 54a, which drives a digital control circuit 56a. The Master 12 includes a port 60a connected to an LO input circuit 64a, which drives an RF circuit 66a.

The Slave 14 includes a port 50b connected to an input clock circuit 54b, which drives a digital control circuit 56b. The Master 12 includes a port 60b connected to an LO input circuit 64b, which drives an RF circuit 66b. The master clock output is connected from the Master 12 the Slave 14 through a connection 70. The connection 70 is electrically balanced, such that the same transmission delay occurs from the port 32 to the port 50a, as from the port 32 to the port 50b. In various example embodiments, the electrical balance of the connection 70 is achieved by matching one or more of a conductor length, conductor width, conductor capacitance, and shielding. Similarly, an LO connection 68 is electrically balanced to have the same transmission delay from port 42 to port 60a, as from port 42 to port 60b. It should be understood that the "same" transmission delay for the master clock connection 70 and for the LO connection 68 presumes normal variations expected from manufacturing and control of environmental variables (e.g., voltage and temperature). While various circuits are shown in the embodiment 10 of FIG. 1, in other embodiments, the circuits (e.g., Clk Out 26a, Clk In 54a. Digital Control 56a) are grouped into related circuit blocks, and/or partitioned in different groupings than shown in FIG. 1, while retaining the same functionality.

Figure 2:
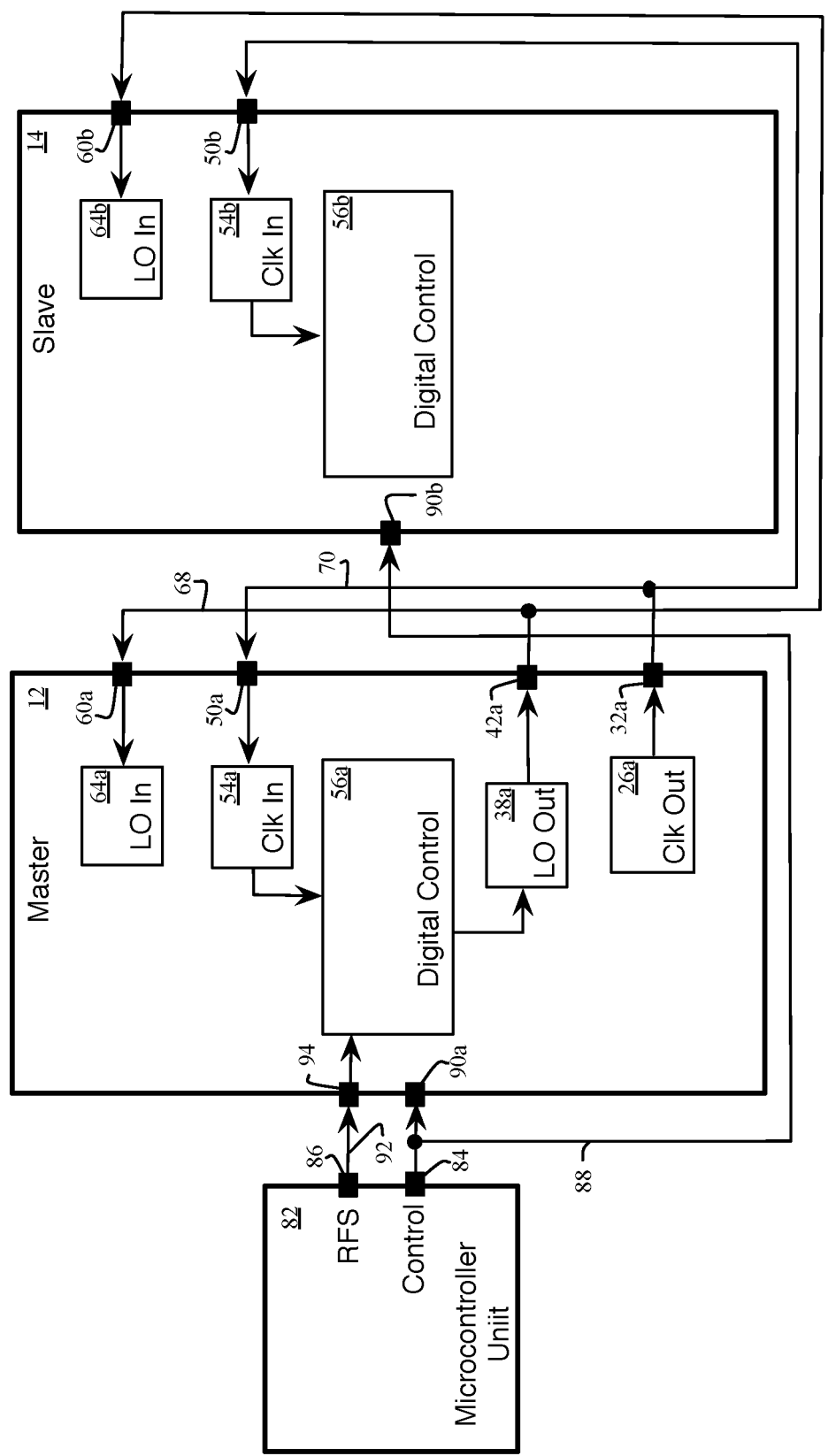
FIG. 2 is a schematic view of the embodiment of FIG. 1, with a microcontroller.

FIG. 2 shows an embodiment 80, which extends upon the embodiment 10 of FIG. 1, with the addition of a Microcontroller Unit (MCU) 82 and related connections to the Master 12 and the Slave 14. In an embodiment, the MCU 82 includes control programs for executing a series of program states. The MCU 82 includes a control port 84 and an RFS port 86. The MCU 82 transmits a control signal from the port 84, over a connection 88 to the Master 12 at port 90a and the Slave 14 at port 90b. The MCU 82 also transmits an RFS signal from the port 86 over a connection 92 to the Master 12 at the port 94. The control signal is used to provide configuration commands and other communications between the MCU and the RADAR units, as will be further described with respect to FIG. 6 through FIG. 8. In various embodiments, the control signal received at ports 90a and 90b is further connected to the respective digital control circuits 56a and 56b for initializing or controlling states. The RFS signal is communicated to the Master 12 to begin a RADAR modulation or ramp (e.g., to start a RADAR frequency chirp). In various embodiments, the master clock generated by the Master 12 is also present at the Master 12 and the Slave 14, however the LO signal is only available during a transmit, receive or self-test state. The MCU 82 places all RADAR units in an adequate state and requests the generation of the LO signal from the Master 12 via the RFS signal.

Figure 3:
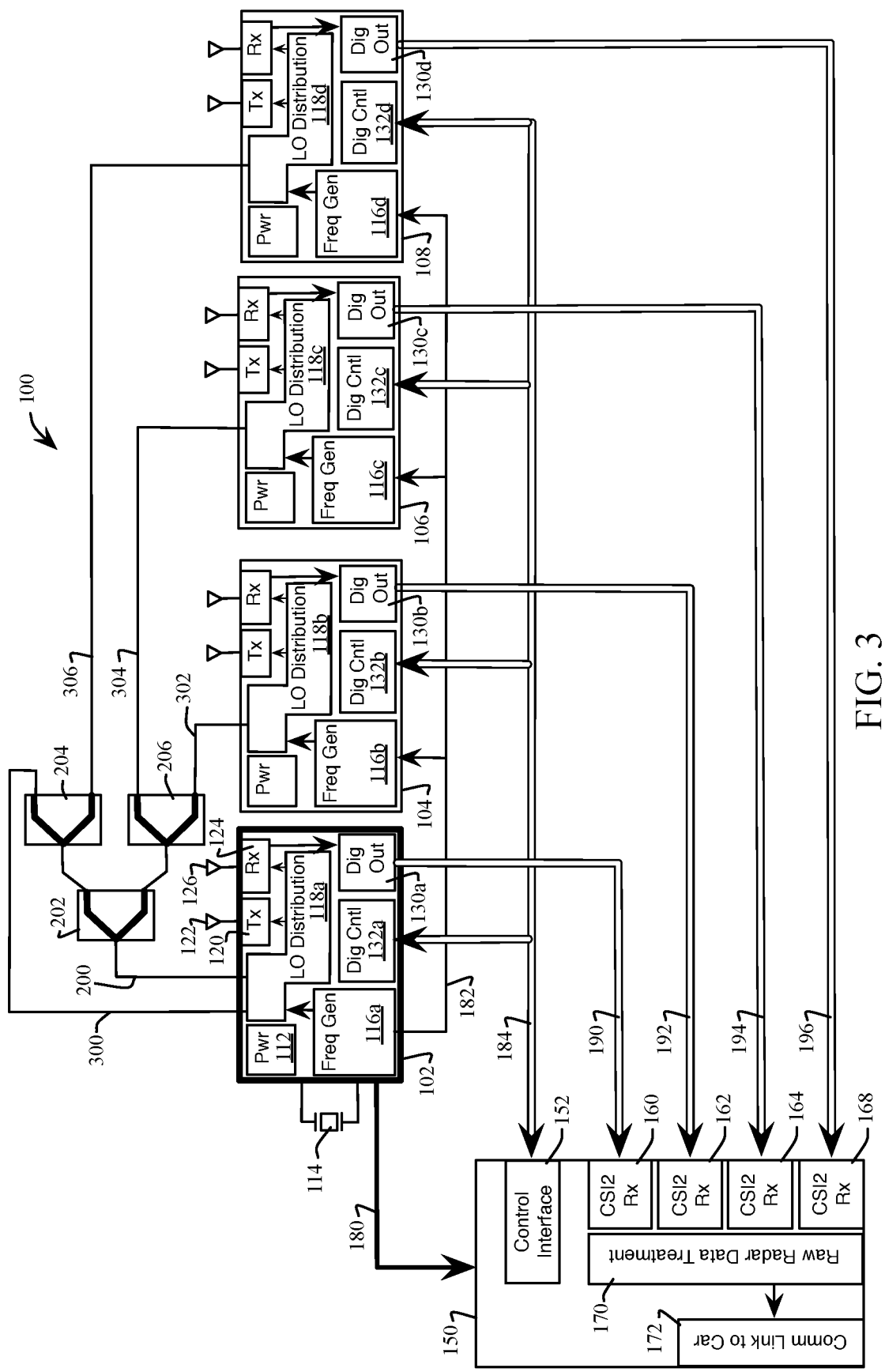
FIG. 3 is a schematic view of a cascaded synchronization system in accordance with an embodiment of the present disclosure.

FIG. 3 shows an embodiment 100 of a RADAR cascaded synchronization system having three slave RADAR units. A Master 102 is cascaded with a first Slave 104, as second Slave 106 and a third Slave 108. The Master 102 includes a power control circuit 112, a crystal 114 used by a frequency generator 116a to generate a master clock and other waveforms within the Master 102. The Master 102 includes an LO distribution circuit 118a for generating and receiving an LO signal. The LO distribution circuit 118a connects to a transmitter circuit 120 having a transmitter antenna 122. The LO distribution circuit 118a connects to a receiver circuit 124 having a receiver antenna 126. A digital output circuit 130a receives a signal from the receiver circuit 124. A digital control circuit 132a receives a command to configure parameters and control state machine execution within the Master 102.

An MCU 150 includes a control interface 152 and a Camera Serial Interface 2 (CSI2) 160, 162, 164 and 168 for the Master 102, first Slave 104, second Slave 106 and third Slave 108 respectively. The CSI2 is a high-speed protocol under the Mobile Industry Processor Interface (MIPI) alliance. A raw RADAR data treatment 170 circuit receives data from the four CSI2 circuits 160, 162, 164 and 168 and transferred post processed data to a communication link 172 to a car, or other vehicle using the cascaded RADAR system.

The frequency generator 116a of the Master 102 generates a master clock 180 to the MCU 150, and a synchronized master clock 182 to the frequency generators 116b, 116c and 116d of the respective slave units 104, 106 and 108. The frequency generator 116a also feeds back the master clock 182 to itself through a electrically balanced network so that each of the Master 102 and the Slaves 104, 106 and 108 receive a synchronized master clock no substantial delay between them. In example embodiments, the master clock 182 is used by an Analog to Digital Converter (ADC) to convert the received signal from the receiver circuit 124, in addition to other uses.

The control interface 152 generates a command 184 to the digital control circuits 132a, 132b, 132c and 132d corresponding to the respective RADAR units 102, 104, 106 and 108. In various embodiments, the command 184 provides configuration data and requests to the Master 102 and slaves RADAR units. In the embodiment 100, the command 184 includes both the control and RFS shown in FIG. 2 being separated over connections 88 and 92 respectively. The digital output circuits 130a, 130b, 130c and 130d of respective RADAR units 102, 104, 106 and 108 are connected to the respective CSI2 receivers 160, 162, 164 and 168 over conductors 190, 192, 194 and 196. The LO distribution circuit 118a of the Master 102 generates an LO signal 200. The LO signal 200 is split by a microwave splitter 202, with each output further split by microwave splitters 204 and 206. The resulting four LO signals 300, 302, 304, 306 are connected to respective RADAR units 102, 104, 106 and 108 over equal length conductors, thus providing matched LO signals at each RADAR unit.

Figure 4:
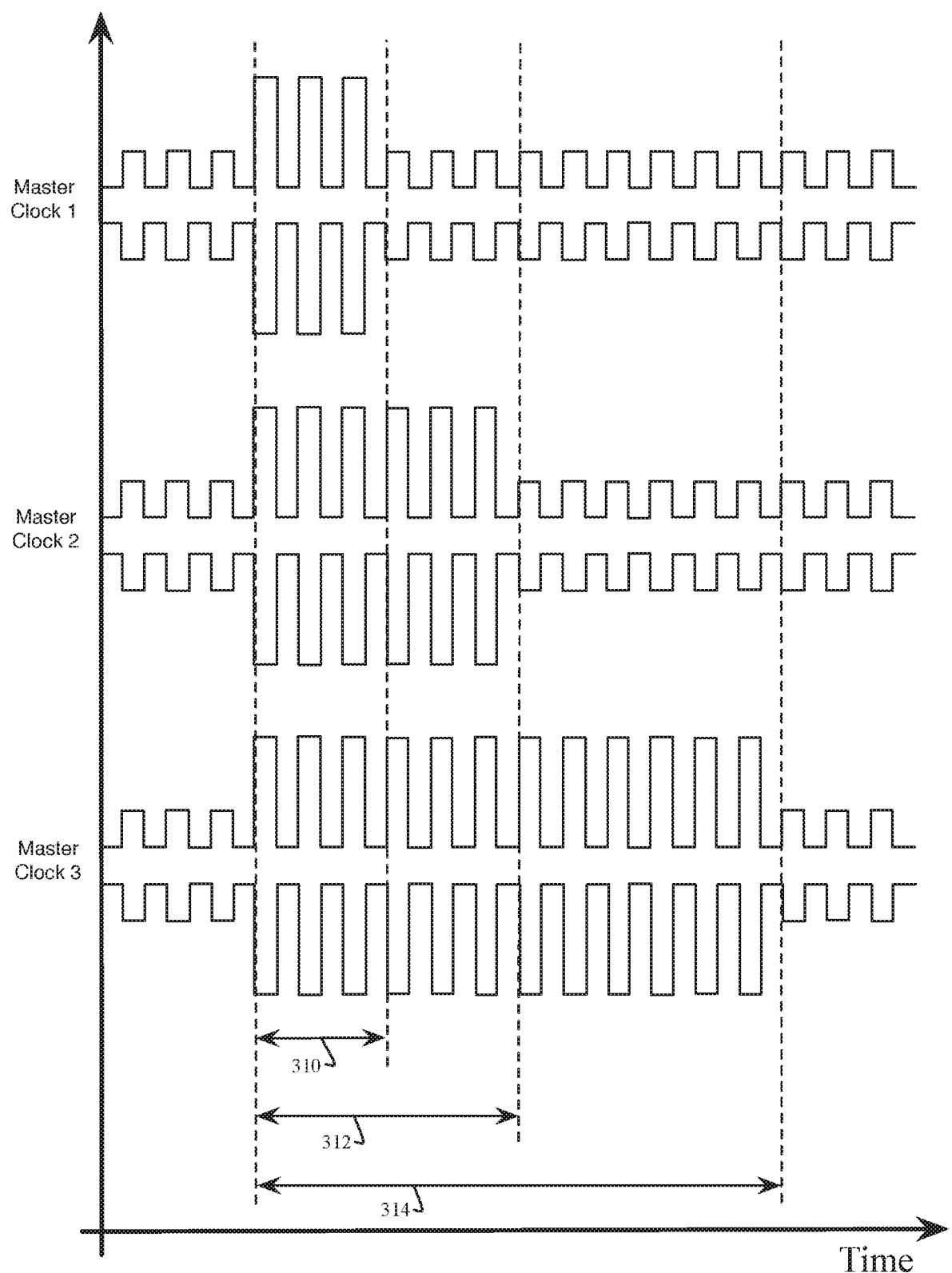
FIG. 4 is a graphical view of a modulated clock with defined durations in accordance with an embodiment of the present disclosure.

FIG. 4, with continued reference to FIG. 3, shows three differential waveforms for the master clock 182. In other embodiments, the master clock 182 is a single-ended clock. Each of the waveforms have amplitude modulation beginning at the leading edge of the RFS signal, and temporal encoding that defines a duration of the modulation corresponding to a code. In one embodiment, the master 102 and each of the slave RADAR units 104, 106 and 108 include a threshold detector (e.g., a comparator) that detects a change in the signal amplitude to determine the duration of the sequence of clock cycles, and thereby the code. Specifically a duration "n" 310 corresponds to a first code, a duration "n×2" 312 corresponds to a second code, and a duration "n×4" 314 corresponds to a third code. In other embodiments, other codes and associated actions are envisioned. The three codes described herein are non-limiting example embodiments.

In various embodiments, the first code corresponds to an action of modulating the LO for a RADAR application, the second code corresponds to an action of testing the presence or absence of the LO signal in the RF transmitter circuit (e.g. circuit 120 of FIG. 3), and the third code corresponds to an action of using a know-signal test, (e.g., a pre-programmed LO signal), injected in to the RF receiver block (e.g., circuit 126 of FIG. 3) for self-testing.

In various embodiments, encoding the various codes by extending the duration of the amplitude modulation of the clock with the RFS signal, follows specific encoding rules. Specifically, the minimum number of clock cycles for a given code is three. This guarantees that the code is always received with a minimum of two detected cycles. Each additional code has a duration of two times the number of clock cycles from the previous code. For example, for a first code, the minimum clock cycle length is two and maximum clock cycle length is three. For a second code, the minimum clock cycle length is five and maximum clock cycle length is six. For a third code, the minimum clock cycle length is eleven and maximum clock cycle length is twelve. When a slave 104, 106 or 108 does not receive the correct number of clock cycles, a flag is set to indicate an invalid code. The flag is then sent to the MCU 150 to indicate that an exception has occurred.

Figure 5:
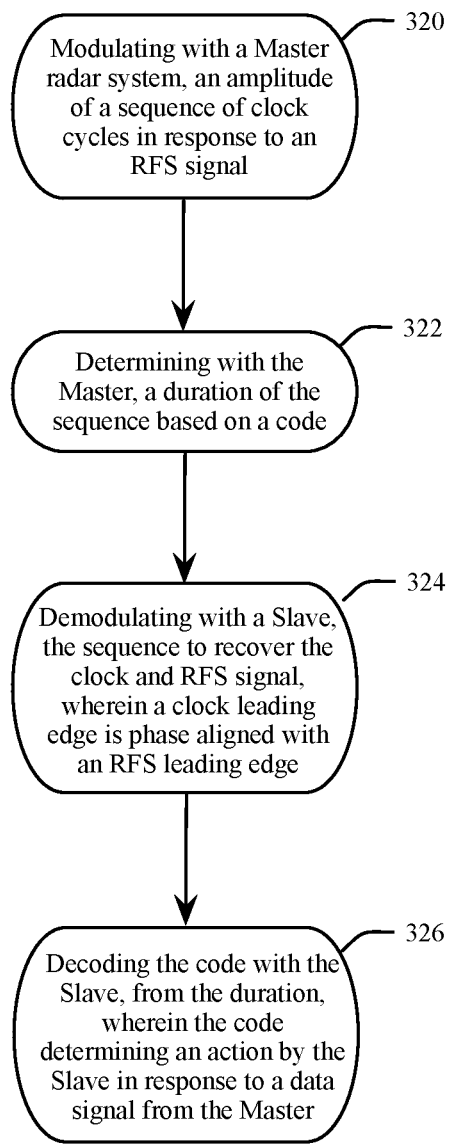
FIG. 5 is a flowchart representation of a method for time-encoded messaging in a RADAR cascaded synchronization system.

Turning to FIG. 5, a method for synchronizing a cascaded RADAR system is described. At 320, a master RADAR system modulates an amplitude of a sequence of clock cycles in response to an RFS signal. At 322, the Master 102 determines a duration of the sequence of clock cycles based on a code. At 324, a Slave (e.g., 104, 106 or 108) demodulates the sequence of clock cycles to recover the clock and the RFS signal. In so doing, the cycle and RFS are phase aligned (e.g., a leading edge of the clock aligns with a leading edge of the RFS, within typical manufacturing and environmental tolerances). At 326, the code is decoded with the Slave based on the duration (e.g., 310, 312 or 314) of the clock sequence that has the higher amplitude due to modulation with the RFS signal. The code determines an action by the Slave in response to receiving a data signal (e.g., LO signal) from the Master.

Figure 6:
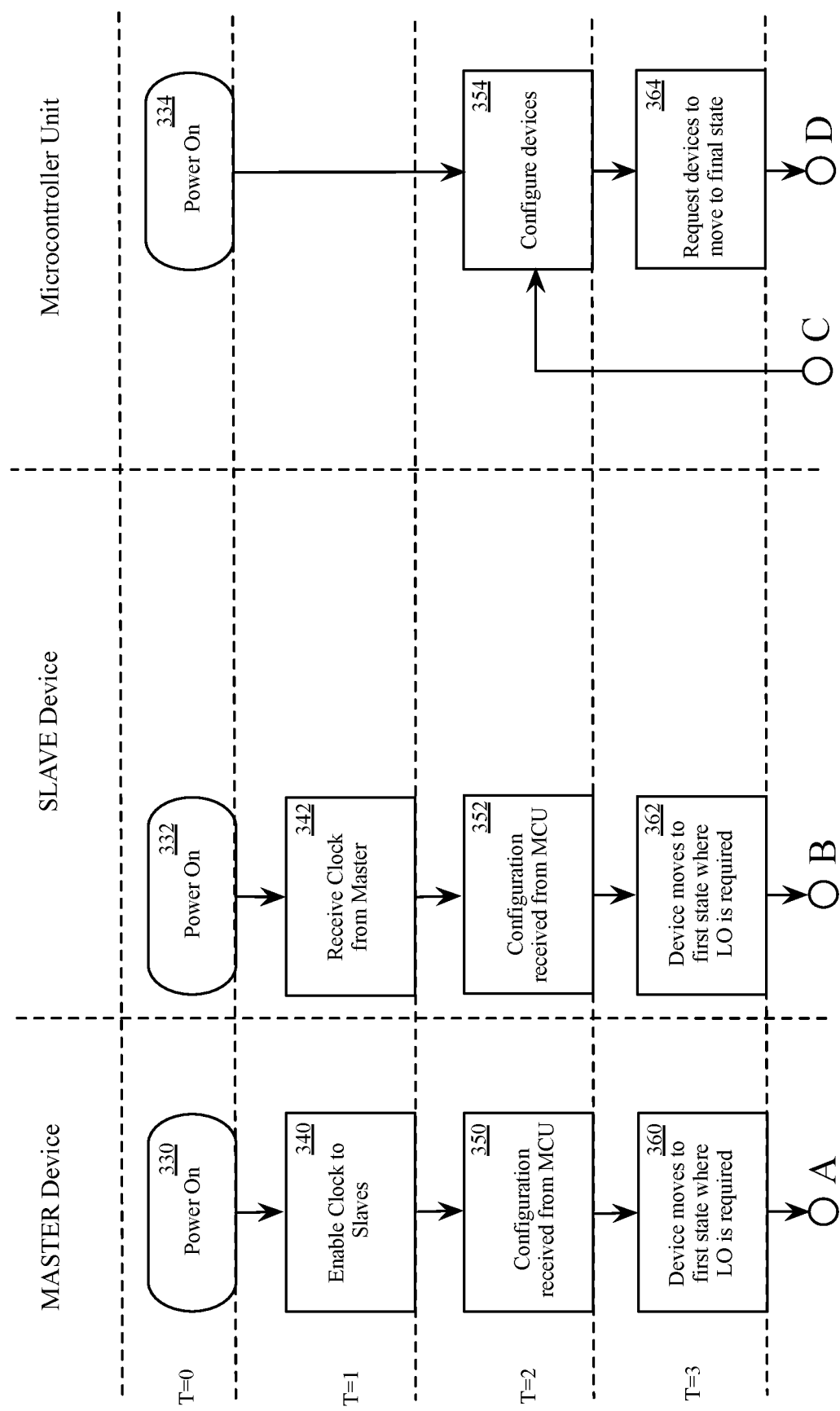
FIG. 6 is a flowchart representation of a method for time-encoded messaging in a RADAR cascaded synchronization system.
Figure 7:
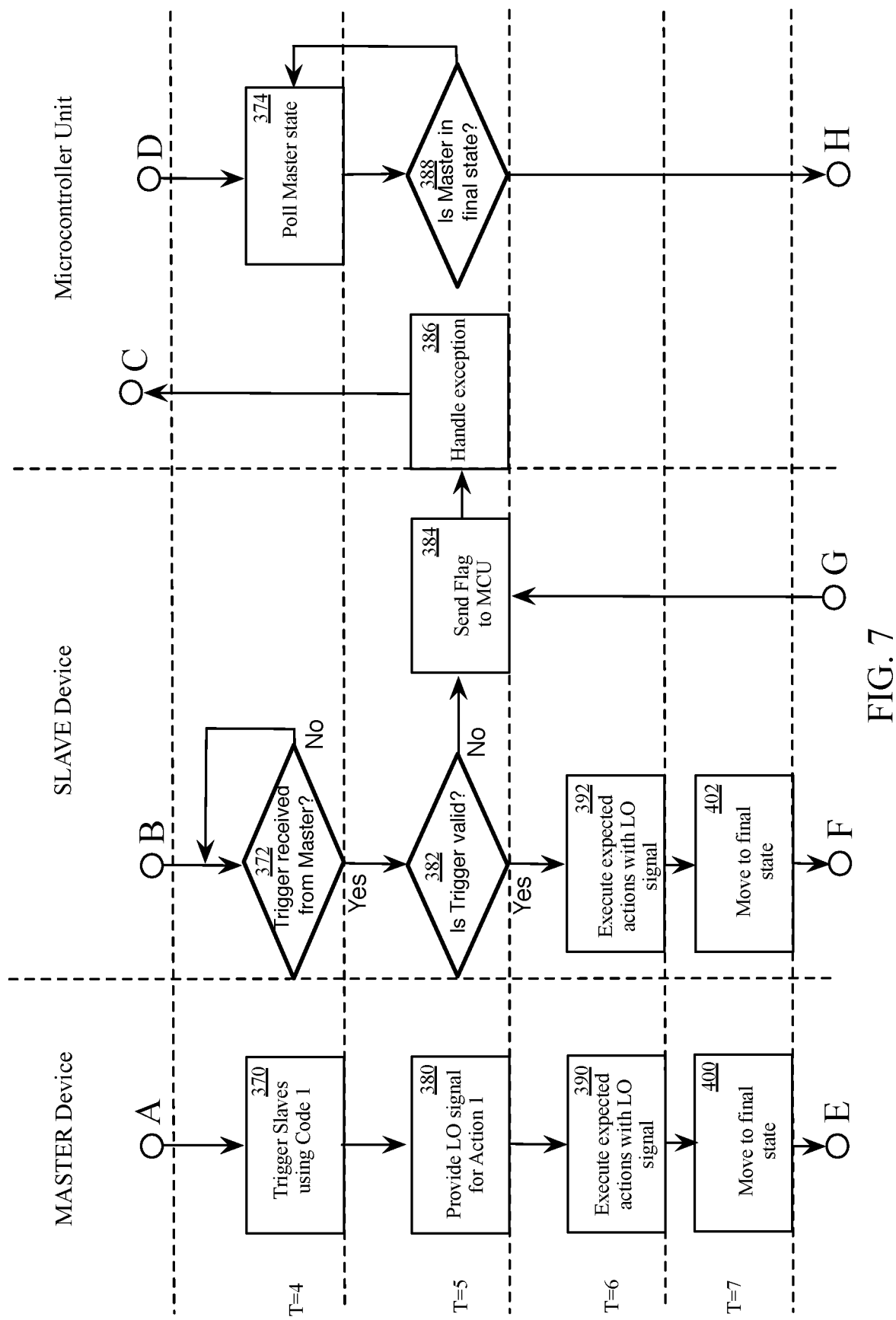
FIG. 7 is a flowchart representation of a continuation of the method shown in FIG. 6.
Figure 8:
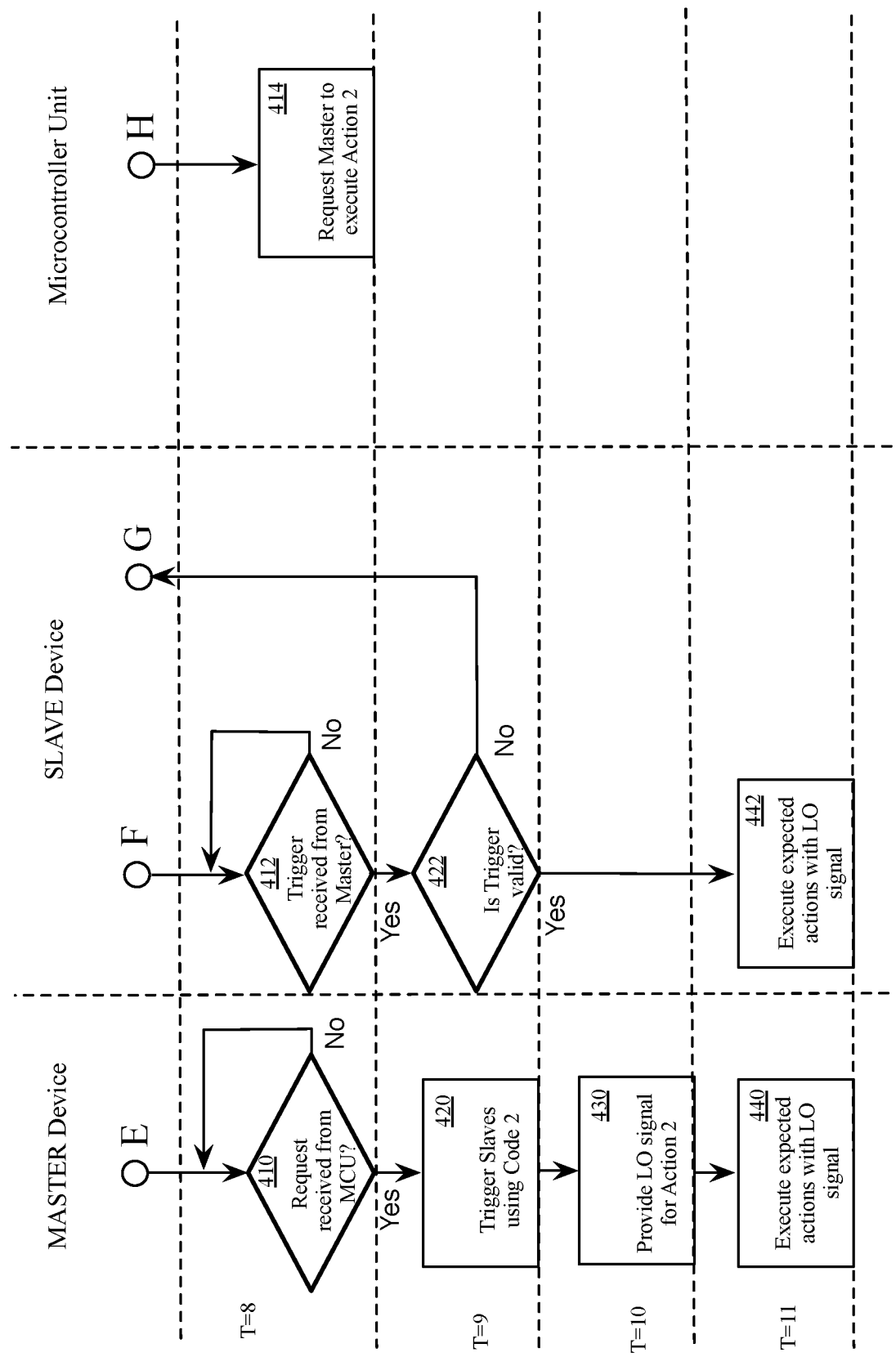
FIG. 8 is a flowchart representation of a continuation of the method shown in FIG. 7.

FIG. 6, FIG. 7 and FIG. 8 show an example method of time-encoded messaging in a RADAR cascaded synchronization system having a Master device (e.g., radar unit), a Slave device and an MCU, with state execution occurring over time slots T=0 to T=11. FIG. 6, FIG. 7 and FIG. 8 show a single slave for clarity, however it should be understood in a cascaded system with more than one slave, each slave will have the same steps as shown for the single slave.

Referring to FIG. 6 and FIG. 2, at T=0, the Master 12. Slave 14 and MCU 82 are powered on at 330, 332 and 334 respectively. At T=1, the Master 12 enables a clock to Slave 14 at 340, and the Slave 14 receives the clock from the Master 12 at 342. At T=2, the MCU 82 will request configuration of the devices at 354 over connection 88. The Master 12 and the Slave 14 will receive the configuration request from the MCU 82 at 350 and 352 respectively. In various embodiments, the configuration includes setting default values for parameters, such as the number of clock cycles corresponding to each of the codes, the number of slaves in the system, characteristics of the beams to be formed, and the like.

At T=3, the MCU 82 requests the Master 12 and the Slave 14 to advance to a final state at 364. The Master 12 and Slave 14 execute a series of states and advance to a first state where the LO is required, at 360 and 362 respectfully. In example embodiments, the Master 12 and the Slave 14 advance to the first state at a different time, due to a difference in execution time or number of executed states between the Master 12 and the Slave 14. The Master 12 and the Slave 14 pause at the first state when LO is required, so that the Master 12 and Slave 14 can have their states resynchronized as required during the RADAR transmission, which relies on LO being received by the Slave 14.

Referring to FIG. 7 and FIG. 2, at T=4, the Master 12 received the RFS from the MCU 82, which begins the amplitude modulation (e.g., amplitude increase) of the sequence of clock cycles, shown in FIG. 4. The amplitude modulation continues for a duration representing one of several codes. This action of receiving the RFS at the Master 12, a modulating the clock provided to each slave is shown as triggering slaves using Code 1 at 370. At T=4, the Slave 14 waits for receipt of the trigger at 372 and advances to T=5 when the trigger is received at the Slave 14. At T=4, the MCU polls at 374 to determine if the Master 12 has advanced to the final state, as previously requested at 364.

At T=5, the Master 12 provides the LO signal at 380 to the Slave 14, to execute Action 1 corresponding to Code 1. At T=5, the Slave 14 determines at 382 if the trigger (e.g. code) is valid. For example a duration of clock cycles having four cycles, or seven cycles is invalid). If at 382, the code is determined to be invalid, the Slave 14 sends a Flag to the MCU 82 at 384 over the control connection 88 (in FIG. 2). In embodiments having more than one Slave, each Slave that detects an invalid code would send a Flag to the MCU, with one ore more valid Flag representing an invalid code. At T=5, the MCU handles an exception at 386 upon receipt of the Flag from the Slave 14. In one embodiment, handling the exception includes returning to 354 to reconfigure the devices and restart the process of executing states to advance to the first state and then towards the final state. At T=5, the MCU 82 continues to poll the Master 12 to determine if the Master 12 is in the in final state, proceeding to T=8 if true, and returning to T=4 if false (e.g., Master 12 is not in the final state).

At T=6, with an LO signal and valid code received, the Master 12 and Slave 14 each execute, at 390 and 392 respectively, the expected actions with the LO signal in accordance with the received code. At T=7, the Master 12 and the Slave 14 each move to the final state at 400 and 402 respectively.

Referring to FIG. 8 and FIG. 2, at T=8, with the Master 12 and the Slave 14 both at the final state requested by the MCU at 364, both the Master 12 and the Slave 14 wait for the next request from the MCU 82. At T=8, the MCU 82 requests at 414, that the Master 12 to execute a second Action (e.g., Action 2) corresponding to Code 2. At T=8, the Master 12 checks at 410 for the receipt of a new request, and continues to T=9 if a request was received. At T=8, the Slave 14 checks at 412 for a receipt of a new trigger (e.g., a start of an amplitude modulated sequence of clocks), and proceeds to T=9 if a trigger was received from the Master 12.

At T=9, the Master 12 sends a Code 2 to the Slave 14 at 420 in accordance with the request from the MCU at 414. At T=9, the Slave 14 decodes the code and determines if the code is valid at 422. If the code is invalid, a Flag is sent to the MCU at 384 (see T=5), otherwise the Slave proceeds to the next time slot. At T=10, the Master 12 provides an LO signal at 430 to the Slave 12, corresponding to Action 2. At T=11, the Master 12 and Slave 14 each execute the expected actions with the LO signal at 440 and 442 respectively.

As will be appreciated, embodiments as disclosed include at least the following. In one embodiment, a RADAR cascaded synchronization system comprises a first one of a plurality of RADAR systems forming a master including a clock modulation circuit configured to transmit a sequence of clock cycles of a clock, and to change an amplitude of the sequence of clock cycles in response to a Ramp Frame Start (RFS) signal. A code is defined by a duration of the sequence of clock cycles. A Local Oscillator (LO) transmitter circuit is configured to transmit an LO signal. A master state machine is configured to communicate the code to the clock modulation circuit to generate the sequence of clock cycles for at least the duration. A second one of the RADAR systems forms a slave including a clock demodulation circuit configured to receive the sequence of clock cycles and to recover the clock and the RFS signal therefrom, wherein a clock leading edge of the clock is phase aligned to an RFS leading edge of the RFS signal. A decoder is configured to determine the code by determining the duration of the sequence of clock cycles. An LO receiver circuit is configured to receive the LO signal and perform an action with a radio frequency circuit based on the code.

Alternative embodiments of the RADAR cascaded synchronization system include one of the following features, or any combination thereof. A Microcontroller Unit (MCU) is connected to the master and configured to provide the RFS signal and the code to the master. The MCU is connected to the slave, and the MCU receives a flag from the decoder when an invalid code is determined. The slave further includes an LO transmitter circuit, wherein the LO transmitter circuit is configured to transmit the LO signal, when the action is a first action. The slave further includes an LO transmitter circuit, wherein the LO transmitter circuit is configured to perform a self-test by detecting the presence of the LO signal at the LO transmitter circuit, when the action is a second action. The LO receiver circuit is configured to receive a test LO signal to perform a self-test, when the action is a third action. The duration of the sequence of clock cycles is an integer multiple of three clock cycles. The slave includes a slave state machine configured to suspend operation of the slave at an intermediate state until the LO signal is received by the LO receiver circuit. A first transmission delay between the clock modulation circuit of the master and the clock demodulation circuit of the slave equals a second transmission delay between the clock modulation circuit of the master and a clock demodulation circuit of the master.

In another embodiment, a method for synchronizing a cascaded RADAR system comprises modulating with a master RADAR system, an amplitude of a sequence of clock cycles of a clock in response to a Ramp Frame Start (RFS) signal. The master RADAR system determines a duration of the sequence of clock cycles based on a code. A slave RADAR system demodulates the sequence of clock cycles to recover the clock and the RFS signal, wherein a clock leading edge of the clock is phase aligned to an RFS leading edge of the RFS signal. The slave RADAR system decodes the code from the duration of the sequence of clock cycles, wherein the code determines an action performed by the slave RADAR system in response to receiving a data signal from the master RADAR system.

Alternative embodiments of the method for synchronizing a cascaded RADAR system include one of the following features, or any combination thereof. The data signal is a Local Oscillator (LO) signal. The master RADAR system receives the RFS signal and the code from a Microcontroller Unit (MCU). The slave RADAR system determines an invalid code and transmitting a flag to the MCU in response thereto. The duration of the sequence of clock cycles is an integer multiple of three clock cycles. Decoding the code requires no less than one clock cycle less than the integer multiple of three clock cycles. The slave RADAR system suspends an execution of a series of slave states until the slave RADAR system receives the data signal. A self-test is performed when the action is a test action.

In another embodiment, a method for synchronizing a cascaded RADAR system comprises transmitting a sequence of clock cycles of a clock from a master to a slave, wherein the master and the slave are each RADAR systems. The master modulates an amplitude of the sequence of clock cycles in response to a Ramp Frame Start (RFS) signal received from a Microcontroller Unit (MCU). A code is determined by the slave from a duration of the sequence of clock cycles, wherein the code determines an action performed by the slave. A configuration is received at the master and the slave from the MCU. A request is received at the master and the slave from the MCU to move to a final state following an intermediate state. The intermediate state requires the slave to receive a Local Oscillator (LO) signal from the master before proceeding to the final state.

Alternative embodiments of the method for synchronizing a cascaded RADAR system include one of the following features, or any combination thereof. The LO signal is received by the slave from the master, a flag is sent from the slave to the MCU when the code is an invalid code, the flag instructs the MCU to reconfigure the master and the slave, and to resend the request to the master and the slave to move to the final state, and the master and the slave execute an action and continuing to the final state if the code is not an invalid code. The master receives a request from the MCU to execute another action, the slave receives the LO signal from the master, the flag is sent from the slave to the MCU when the code is the invalid code, and the master and the slave execute another action if the code is not an invalid code.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A RADAR cascaded synchronization system comprising:
   a first one of a plurality of RADAR systems forming a master including:
   a clock modulation circuit configured to transmit a sequence of clock cycles of a clock, and to change an amplitude of the sequence of clock cycles in response to a Ramp Frame Start (RFS) signal, a code defined by a duration of the sequence of clock cycles,
   a Local Oscillator (LO) transmitter circuit configured to transmit an LO signal, and
   a master state machine configured to communicate the code to the clock modulation circuit to generate the sequence of clock cycles for at least the duration; and
   a second one of the RADAR systems forming a slave including:
   a clock demodulation circuit configured to receive the sequence of clock cycles and to recover the clock and the RFS signal therefrom, wherein a clock leading edge of the clock is phase aligned to an RFS leading edge of the RFS signal,
   a decoder configured to determine the code by determining the duration of the sequence of clock cycles, and
   an LO receiver circuit configured to receive the LO signal and perform an action with a radio frequency circuit based on the code.

2. The system of claim 1 further comprising a Microcontroller Unit (MCU) connected to the master and configured to provide the RFS signal and the code to the master.

3. The system of claim 2 wherein the MCU is connected to the slave, and the MCU receives a flag from the decoder when an invalid code is determined.

4. The system of claim 1 wherein the duration of the sequence of clock cycles is an integer multiple of three clock cycles.

5. The system of claim 1 wherein the slave includes a slave state machine configured to suspend operation of the slave at an intermediate state until the LO signal is received by the LO receiver circuit.

6. A method for synchronizing a cascaded RADAR system comprising:
modulating, with a master RADAR system, an amplitude of a sequence of clock cycles of a clock in response to a Ramp Frame Start (RFS) signal;
determining, with the master RADAR system, a duration of the sequence of clock cycles based on a code;
demodulating, with a slave RADAR system, the sequence of clock cycles to recover the clock and the RFS signal, wherein a clock leading edge of the clock is phase aligned to an RFS leading edge of the RFS signal; and
decoding the code, with the slave RADAR system, from the duration of the sequence of clock cycles, wherein the code determines an action performed by the slave RADAR system in response to receiving a data signal from the master RADAR system.

7. The method of claim 6 wherein the data signal is a Local Oscillator (LO) signal.

8. The method of claim 6 further comprising receiving, by the master RADAR system, the RFS signal and the code from a Microcontroller Unit (MCU).

9. The method of claim 8 further comprising determining, by the slave RADAR system, an invalid code and transmitting a flag to the MCU in response thereto.

10. The method of claim 6 wherein the duration of the sequence of clock cycles is an integer multiple of three clock cycles.

11. The method of claim 10 wherein decoding the code requires no less than one clock cycle less than the integer multiple of three clock cycles.

12. The method of claim 6 further comprising suspending, by the slave RADAR system, an execution of a series of slave states until the slave RADAR system receives the data signal.

13. A method for synchronizing a cascaded RADAR system comprising:
transmitting a sequence of clock cycles of a clock from a master to a slave, wherein the master and the slave are each RADAR systems, the master modulating an amplitude of the sequence of clock cycles in response to a Ramp Frame Start (RFS) signal received from a Microcontroller Unit (MCU), a code determined by the slave from a duration of the sequence of clock cycles, wherein the code determines an action performed by the slave;
receiving a configuration at the master and the slave from the MCU; and
receiving a request at the master and the slave from the MCU to move to a final state following an intermediate state, the intermediate state requiring the slave to receive a Local Oscillator (LO) signal from the master before proceeding to the final state.

14. The method of claim 13 further comprising:
receiving by the slave, the LO signal from the master,
sending a flag from the slave to the MCU when the code is an invalid code, the flag instructing the MCU to reconfigure the master and the slave, and to resend the request to the master and the slave to move to the final state, and
the master and the slave executing an action and continuing to the final state if the code is not an invalid code.

15. The method of claim 14 further comprising:
receiving by the master a request from the MCU to execute another action,
receiving by the slave, the LO signal from the master,
sending the flag from the slave to the MCU when the code is the invalid code, and
the master and the slave executing another action if the code is not an invalid code.

16. The method of claim 13 further comprising:
suspending operation of the slave at an intermediate state until the LO signal is received by the slave.

17. The method of claim 13, wherein the duration of the sequence of clock cycles is an integer multiple of three clock cycles.

18. The method of claim 13 further comprising:
demodulating, with the slave RADAR system, the sequence of clock cycles to recover the clock and the RFS signal, wherein a clock leading edge of the clock is phase aligned to an RFS leading edge of the RFS signal.

19. The method of claim 13, further comprising:
decoding the code, with the slave RADAR system, from the duration of the sequence of clock cycles, wherein the code determines the action performed by the slave RADAR system in response to receiving a data signal from the master RADAR system.

20. The method of claim 19, further comprising:
suspending, by the slave RADAR system, an execution of a series of slave states until the slave RADAR system receives the data signal.

* * * * *